(12) United States Patent
Daghighian et al.

(10) Patent No.: US 9,001,530 B2
(45) Date of Patent: Apr. 7, 2015

(54) INTEGRATED CIRCUIT WITH VOLTAGE CONVERSION

(71) Applicant: Finisar Corporation, Sunnyvale, CA (US)

(72) Inventors: Henry M. Daghighian, Menlo Park, CA (US); Curtis Robinson, Sunnyvale, CA (US); Lucy Hosking, Santa Cruz (CA)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 13/922,083

(22) Filed: Jun. 19, 2013

(65) Prior Publication Data

US 2014/0002180 A1    Jan. 2, 2014

Related U.S. Application Data

(60) Provisional application No. 61/666,263, filed on Jun. 29, 2012.

(51) Int. Cl.
H02M 3/156 (2006.01)
H02M 1/088 (2006.01)
H02M 3/337 (2006.01)

(52) U.S. Cl.
CPC .............. *H02M 3/156* (2013.01); *H02M 1/088* (2013.01); *H02M 3/337* (2013.01)

(58) Field of Classification Search
None
See application file for complete search history.

(56) References Cited

U.S. PATENT DOCUMENTS

| | | | | |
|---|---|---|---|---|
| 4,659,981 A * | 4/1987 | Lumsden | ...... | 323/356 |
| 5,158,900 A * | 10/1992 | Lau et al. | ...... | 438/202 |
| 5,304,501 A * | 4/1994 | Tong | ...... | 438/207 |
| 5,548,112 A * | 8/1996 | Nakase et al. | ...... | 250/214 C |
| 5,625,181 A * | 4/1997 | Yasuda et al. | ...... | 250/214 A |
| 5,705,879 A * | 1/1998 | Abe et al. | ...... | 310/359 |
| 5,777,858 A * | 7/1998 | Rodulfo | ...... | 363/24 |
| 6,118,679 A * | 9/2000 | Smith | ...... | 363/70 |
| 6,359,293 B1 * | 3/2002 | Woodward | ...... | 257/257 |
| 6,482,671 B2 * | 11/2002 | Woodward | ...... | 438/91 |
| 7,071,455 B2 * | 7/2006 | Irie | ...... | 250/214 R |
| 7,171,128 B2 * | 1/2007 | Hasegawa et al. | ...... | 398/202 |
| 7,282,692 B2 * | 10/2007 | Ichino | ...... | 250/214 R |
| 7,433,606 B2 * | 10/2008 | Wernlund et al. | ...... | 398/202 |
| 7,911,192 B2 * | 3/2011 | Wang | ...... | 323/282 |
| 2003/0122533 A1 * | 7/2003 | Prescott | ...... | 323/313 |
| 2004/0129863 A1 * | 7/2004 | Cheung et al. | ...... | 250/214 C |
| 2004/0135565 A1 * | 7/2004 | Douma et al. | ...... | 323/283 |
| 2009/0086512 A1 * | 4/2009 | Fahlenkamp et al. | ...... | 363/21.06 |
| 2010/0014875 A1 * | 1/2010 | Uto | ...... | 398/202 |
| 2013/0063984 A1 * | 3/2013 | Sandner et al. | ...... | 363/20 |
| 2013/0083563 A1 * | 4/2013 | Wang et al. | ...... | 363/17 |

* cited by examiner

*Primary Examiner* — Thomas J Hiltunen
(74) *Attorney, Agent, or Firm* — Maschoff Brennan (57) ABSTRACT

An integrated circuit may include a signal generator configured to generate a switching signal and a switching unit coupled to the signal generator. The switching unit may be configured to generate a pulsed current based on the switching signal using a first voltage. The integrated circuit may also include an inductive unit coupled to the switching unit. The inductive unit may be configured to receive the pulsed current and to generate a second voltage different from the first voltage.

19 Claims, 9 Drawing Sheets

INTEGRATED CIRCUIT WITH VOLTAGE CONVERSION

CROSS-REFERENCE TO RELATED APPLICATIONS

This patent application claims the benefit of and priority to U.S. Provisional Application No. 61/666,263, filed Jun. 29, 2012, which is incorporated herein by reference.

TECHNICAL FIELD

Some embodiments relate generally to integrated circuits.

BACKGROUND

Communication modules, such as electronic or optoelectronic transceivers or transponder modules, are used in electronic and optoelectronic communication. Such communication modules may include multiple components that operate at various voltages. An example of such a component is an optical receiver that converts an optical signal (incident light) into an electrical signal or voltage using, for example, a photodetector. A photodiode or photodiode array may be used as the photodetector to generate the electrical signal from the incident light. The communication module may also include an electrical circuit to receive and process the electrical signal from the photodetector to suit the desired application.

Avalanche photodiodes (APDs) may be used as photodetectors that provide internal electrical gain and therefore have high sensitivity suitable for very weak optical signal detection. After the optical signal is converted into the electrical signal by the optical receiver, the optical receiver amplifies the electrical signal, and converts the electrical signal into an electrical digital data stream.

The avalanche photodiode may be operated at a voltage close to its breakdown voltage to achieve maximum sensitivity. This operation voltage is often higher than any available voltage supply used elsewhere in such equipment and so some form of power conversion circuitry must be provided to supply the higher voltages.

The subject matter claimed herein is not limited to embodiments that solve any disadvantages or that operate only in environments such as those described above. Rather, this background is only provided to illustrate one example technology area where some embodiments described herein may be practiced.

SUMMARY

Some example embodiments generally relate to integrated circuits that provide voltage conversions.

In an example embodiment, an integrated circuit may include a signal generator configured to generate a switching signal and a switching unit coupled to the signal generator. The switching unit may be configured to generate a pulsed current based on the switching signal using a first voltage. The integrated circuit may also include an inductive unit coupled to the switching unit. The inductive unit may be configured to receive the pulsed current and to generate a second voltage different from the first voltage.

In another example embodiment, an integrated circuit may include an input node configured to be coupled to a first voltage. The integrated circuit may also include a signal generator configured to generate a switching signal and a switching unit coupled to the signal generator. The switching unit may include multiple switches that each include multiple transistors. The multiple switches may be configured to generate a pulsed current based on the switching signal using the first voltage. The integrated circuit may also include an inductive unit coupled to the switching unit. The inductive unit may be configured to receive the pulsed current and to generate a second voltage different from the first voltage. The integrated circuit may also include an avalanche photodiode configured to receive the second voltage and a substrate upon which the avalanche photodiode, the inductive unit, the switching unit, and the signal generator are formed.

In another example embodiment, a method of generating a voltage in an integrated circuit is provided. The method may include generating a switching signal and generating a pulsed current using the switching signal and a first voltage. The method may also include generating a second voltage by an inductive unit using the pulsed current. The second voltage may be larger in magnitude than the first voltage. The method may also include supplying the second voltage to a component in the integrated circuit, wherein generating the pulsed current and generating the second voltage occur in the integrated circuit.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description that follows or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify certain aspects of the present invention, a more particular description of the invention will be rendered by reference to example embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which.

DETAILED DESCRIPTION

Some embodiments herein relate to an integrated circuit (IC) that includes a voltage converter. In particular, the voltage converter includes a signal generator, a switching unit, and an inductive unit that are configured to generate a second voltage based on a first voltage supplied to the integrated circuit or derived from a voltage supplied to the integrated circuit. The second voltage may be higher than the first voltage. In some embodiments, the second voltage may be 2 to 50 times greater in magnitude than the first voltage.

The integrated circuit including a voltage converter reduces or eliminates external components that would otherwise be coupled to the integrated circuit to provide the second voltage. For example, previous integrated circuits that include an internal circuit that use a voltage higher than a supply voltage would have the higher voltage supplied by an external voltage converter that included non-integrated passive devices. The current description illustrates various embodiments where the voltage converter is integrated into the integrated circuit.

Reference will now be made to the drawings to describe various aspects of example embodiments. It is to be understood that the drawings are diagrammatic and schematic representations of such example embodiments, and are not limiting of the present invention, nor are they necessarily drawn to scale.

Figure 1:
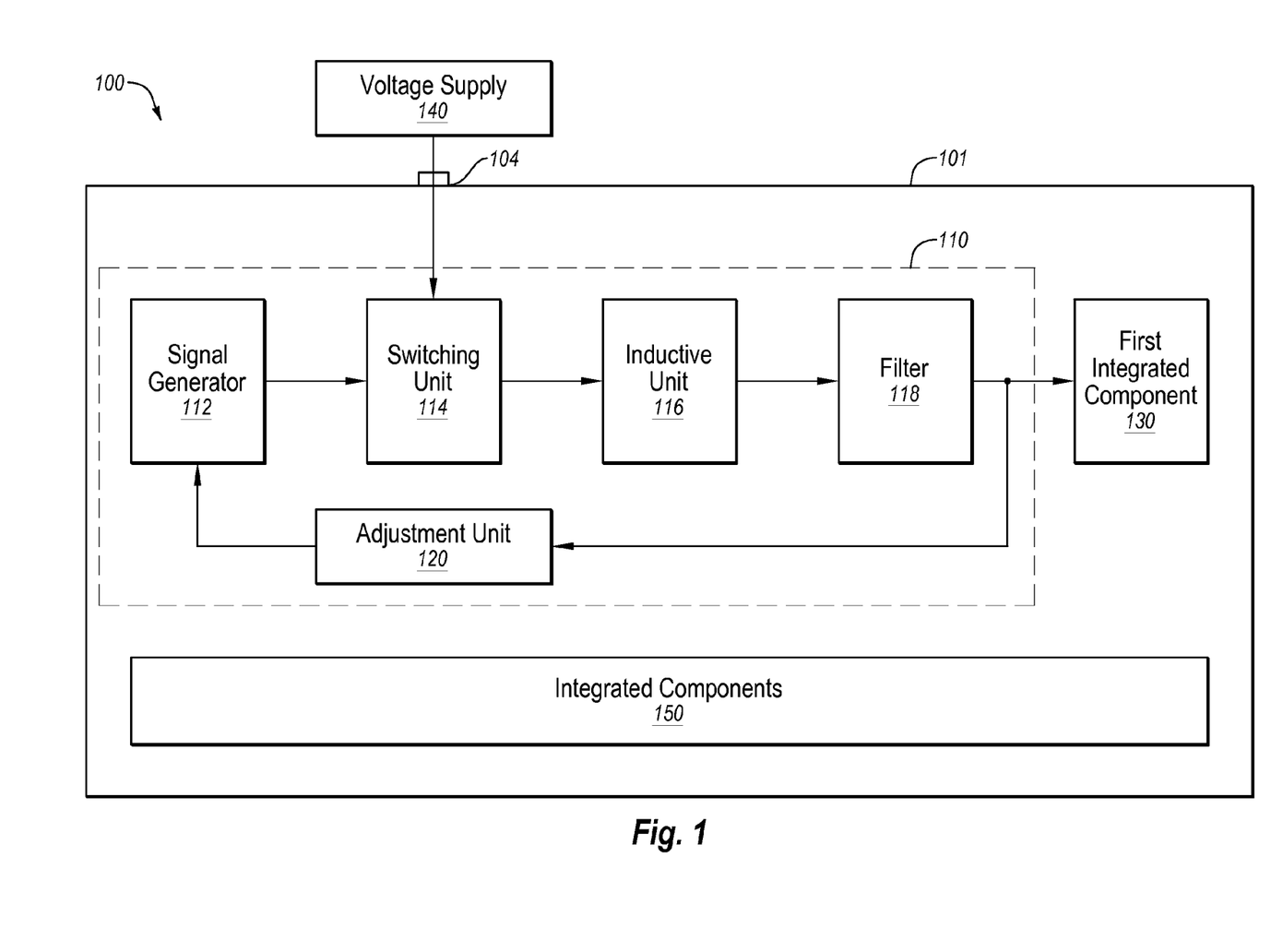
FIG. 1 is a block diagram of an example integrated circuit that includes a voltage converter.

FIG. 1 is a block diagram of an example IC 100 that includes a voltage converter 110, arranged in accordance with at least some embodiments described herein. The IC 100 may be formed on a substrate 101. The substrate 101 may include a silicon layer of a silicon-on-insulator (SOI) substrate or a bulk silicon substrate. In embodiments in which the substrate 101 comprises a SOI substrate, the substrate 101 may include a layer of silicon overlying and in contact with a silicon dioxide material, which may be referred to as a "buried oxide." Circuits fabricated on SOI substrates may have various advantages over circuits fabricated on other substrates, such as improved isolation between components, higher breakdown voltage capability, improved signal integrity due to reduced cross talk and faster operating speeds.

In some embodiments, the IC 100 may be a monolithic chip. In these and other embodiments, the IC 100 may be composed of semiconductor materials with patterns of trace elements diffused into the semiconductor materials. The IC 100 may be constructed using various semiconductor technologies such as complementary metal-oxide-semiconductor ("CMOS"), Bipolar CMOS ("BiCMOS"), extended drain CMOS ("EDMOS"), orthogonal gate EDMOS ("OG EDMOS"), Silicon-Germanium ("SiGe") heterojunction bipolar transistor ("HBT"), or some combination thereof.

In some embodiments, the IC 100 may be a mixed-signal IC. That is, the IC 100 may include analog circuits and digital circuits. In these and other embodiments, the above semiconductor technologies (e.g., CMOS, BiCMOS, EDMOS, OG EDMOS, and SiGe HBT) may be incorporated in portions of the IC 100.

In some embodiments, the IC 100 may include transistors or other active devices formed in an active layer of the IC 100 that may be constructed using various types of semiconductor technologies. For example, the active devices may be constructed using CMOS, BiCMOS, EDMOS, OG EDMOS, or some combination thereof. Additionally, the active devices may be constructed of a specific subset of the semiconductor technologies. The specific subset of the semiconductor technologies may be determined to optimize a quality of the active devices. For example, the quality might include efficient switching, minimal capacitance, minimal resistance, or some combination thereof. For example, some of the active devices may be transistors that may include one or more switching metal-oxide-semiconductor field effect transistors (MOSFET) constructed using OG EDMOS technology to minimize capacitance and to minimize resistance when the switching MOSFETs are operating allowing the switching MOSFETs to operate at frequencies above 30 megahertz (MHz) with reduced losses as compared to MOSFETs constructed with basic CMOS technology.

The IC 100 may include various components integrated into the IC 100, including the voltage converter 110, a first integrated component 130, and integrated components 150. The voltage converter 110 may include various components integrated into the IC 100, including a signal generator 112, a switching unit 114, an inductive unit 116, a filter 118, and an adjustment unit 120. The various components in the voltage converter 110 may be a combination of integrated active and passive devices. Passive devices as used herein may include resistors, capacitors, inductors, diodes, among other passive electrical components. In some embodiments, components integrated into the IC 100 may include the components being formed on a single substrate.

The voltage converter 110 may be configured to generate a voltage, referred to herein as the "generated voltage," which differs from a voltage supplied to the IC 100 by a voltage supply 140 through an input node 104 or otherwise generated by the IC 100 based on the voltage supplied to the IC 100, referred to herein as the "supply voltage." In some embodiments, a magnitude of the generated voltage may be greater than a magnitude of the supply voltage. In particular, in some embodiments, the magnitude of the generated voltage may be 2-50 times greater than the magnitude of the supply voltage. For example, in some embodiments, the supply voltage may be 3.3 volts and the generated voltage may be 40 volts. As another example, the supply voltage may be 1.8 volts and the generated voltage may be 35 volts. In some embodiments, the generated voltage may be a different polarity or the same polarity as the supply voltage.

The signal generator 112 may be coupled to the switching unit 114 and may be configured to provide a switching signal to the switching unit 114. In some embodiments, the signal generator 112 may include a pulse width modulated circuit configured to generate a pulse width modulated (PWM) signal. The switching signal may have a frequency greater than 30 MHz. In some embodiments, the frequency of the switching signal may be between 50 and 500 MHz. Alternately or additionally, the frequency of the switching signal may be between 200 and 500 MHz. Different aspects of the switching signal, such as the duty cycle, the frequency, among others, may affect the magnitude of the generated voltage produced by the voltage converter 110.

The switching unit 114 may be coupled to the inductive unit 116, the signal generator 112, and the input node 104. The switching unit 114 may be configured to receive the switching signal from the signal generator 112 and to provide a pulsed current to the inductive unit 116 based on the switching signal. The duration and frequency of the pulsed current may be related to the duty cycle and/or frequency of the switching cycle. Thus, a change in the switching signal may result in a change in the pulsed current.

The switching unit 114 may generate the pulsed current using the supplied voltage provided by the voltage supply 140. In some embodiments, the switching unit 114 may include multiple switches. In these and other embodiments, the multiple switches may each include multiple transistors. In particular, the multiple switches may each include multiple OG EDMOS transistors configured in a stacked formation.

The inductive unit 116 may be coupled to the switching unit 114 and the filter 118. The inductive unit 116 may be configured to receive the pulsed current from the signal generator 112. Using the pulsed current, the inductive unit 116 may generate the generated voltage and may supply the generated voltage to the filter 118. The duration and frequency of the pulsed current may be related to the magnitude and/or polarity of the generated voltage. For example, a long duration pulsed current that results in the pulsed current being applied for a longer time period may result in a higher magnitude of the generated voltage. Thus, a change in the pulsed current may result in a change in the magnitude of the generated voltage.

In some embodiments, the inductive unit 116 may include one or more inductors. Alternately or additionally, the one or more inductors may be configured as a transformer or an auto-transformer.

The filter 118 may be coupled to the inductive unit 116 and the first integrated component 130. The filter 118 may be configured to filter the generated voltage supplied by the inductive unit 116. The filter 118 may filter the generated voltage to remove ripples or other artifacts from the generated voltage. In some embodiments, the filter 118 may include integrated passive components, such as resistors, capacitors, or inductors. The filter 118 may provide the filtered generated voltage to the first integrated component 130 and the adjustment unit 120.

The first integrated component 130 may use the generated voltage during operation. For example, in some embodiments, the first integrated component 130 may be an avalanche photodiode (APD), a variable optical attenuator (VOA), or some other integrated component that uses a voltage different from the supply voltage during operation. Other examples of the first integrated component 130 may include a wireless transponder or some other wireless communication component or a display unit, such as a liquid crystal display (LCD).

The adjustment unit 120 may be coupled to the filter 118 and the signal generator 112. The adjustment unit 120 may be configured to generate a control signal to control the frequency, duty cycle, or some other aspect of the switching signal generated by the signal generator 112. In some embodiments, the adjustment unit 120 may have a target magnitude for the generated voltage. The adjustment unit 120 may adjust the control signal to cause the switching signal to change to adjust the magnitude of the generated voltage as explained herein.

By having the switching signal operating at frequencies greater than 30 MHz the size of the passive components in the voltage converter 110 may be reduced. For example, a size of an inductor in the inductive unit 116 that may be used in a transformer may be inversely proportional to the frequency of the switching signal for a given power rating. In typical voltage converters, the switching signal operates at 2 to 3 MHz, resulting in an inductor in the typical voltage converter being in a microhenry size range. By operating the switching signal at greater than 30 MHz, an inductor in the inductive unit 116 may be in the nanohenry size range and may thus be integrated into the IC 100. Alternately or additionally, other passive components used in the voltage converter 110, such as capacitors, may be of a size range so that they may be integrated into the IC 100.

Operating the switching signal at frequencies greater than 30 MHz, for example at 200 MHz, results in the switches of the switching unit 114 having to switch at higher frequencies while still providing the current pulses to the inductive unit 116. Various types of transistors, such as OG EDMOS transistors, may have internal capacitances low enough and other characteristics to operate at the higher frequencies of the switching signal. These types of transistors may be used to form the switches in the switching unit 114.

Furthermore, the transistors that may form the switches in the switching unit 114 may see the generated voltage produced by the inductive unit 116. When the generated voltage is multiple times larger than the supply voltage, the generated voltage may be greater than a breakdown voltage of a transistor that may operate at the frequencies of the switching signal. To explain further, a width and other characteristics of a transistor may affect the breakdown voltage of the transistor, the switching speed of the transistor, and a current able to be supplied by the transistor. A higher switching speed in a transistor typically results in the breakdown voltage of the transistor being lowered. Thus, the generated voltage may cause a single transistor used as a switch in the switching unit 114 to break down when configured to operate at the frequencies of the switching signal that provides for integration of passive components into the IC 100.

To avoid breaking down a transistor used to form the switches in the switching unit 114 due to the generated voltage being higher than a corresponding breakdown voltage, multiple transistors may be used in a single switch and may be arranged in a stacked formation. Using a stacked formation, each of the transistors in a single switch may see a portion of the generated voltage. The portion of the generated voltage may be less than the breakdown voltage of each of the transistors such that the transistors may withstand the generated voltage and may operate at the frequencies of the switching signal that allow for the passive components of the inductive unit 116 and the filter 118 to be integrated into the IC 100.

As illustrated in FIG. 1, the IC 100 may include other integrated components 150. The other integrated components 150 may be formed on the same substrate as the voltage converter 110. Having the voltage converter 110, first integrated component 130, and the other integrated components 150 on the IC 100, and in particular, on a single substrate or multiple substrates that are joined in a package for a single die, may reduce pin counts on the IC 100, reduce an overall footprint for circuitry to support the IC 100, as well as offer other advantages.

The other integrated components 150 may vary based on the purpose of the IC 100. For example, in some embodiments, the IC 100 may be used in communication devices such as optoelectronic devices. As used herein, the term "optoelectronic device" includes a device having both optical and electrical components. Examples of optoelectronic devices include, but are not limited to, transponders, transceivers, transmitters, and receivers. In these and other embodiments, the integrated components 150 may include a transimpedance amplifier (TIA), a clock and data recovery (CDR) circuit, a microcontroller, among other components.

Alternately or additionally, the IC 100 may be used in wireless communication devices such as cellphones. In these and other embodiments, the integrated components may include an LCD driver, a microprocessor, a wireless connectivity component, among other components.

Furthermore, note that, as used herein, "coupled to" is defined to mean both a direct connection between two or more circuit objects without any intervening circuit objects and an indirect connection between two or more circuit objects with one or more intervening circuit objects. For example, two circuit objects directly connected to each other are "coupled to" one another. The same two circuit objects would also be "coupled to" each other if there were one or more intervening circuit objects connected between them.

Modifications, additions, or omissions may be made to the IC 100 without departing from the scope of the present disclosure. For example, the voltage converter 110 may not include the filter 118 and/or the adjustment unit 120.

Figure 2:
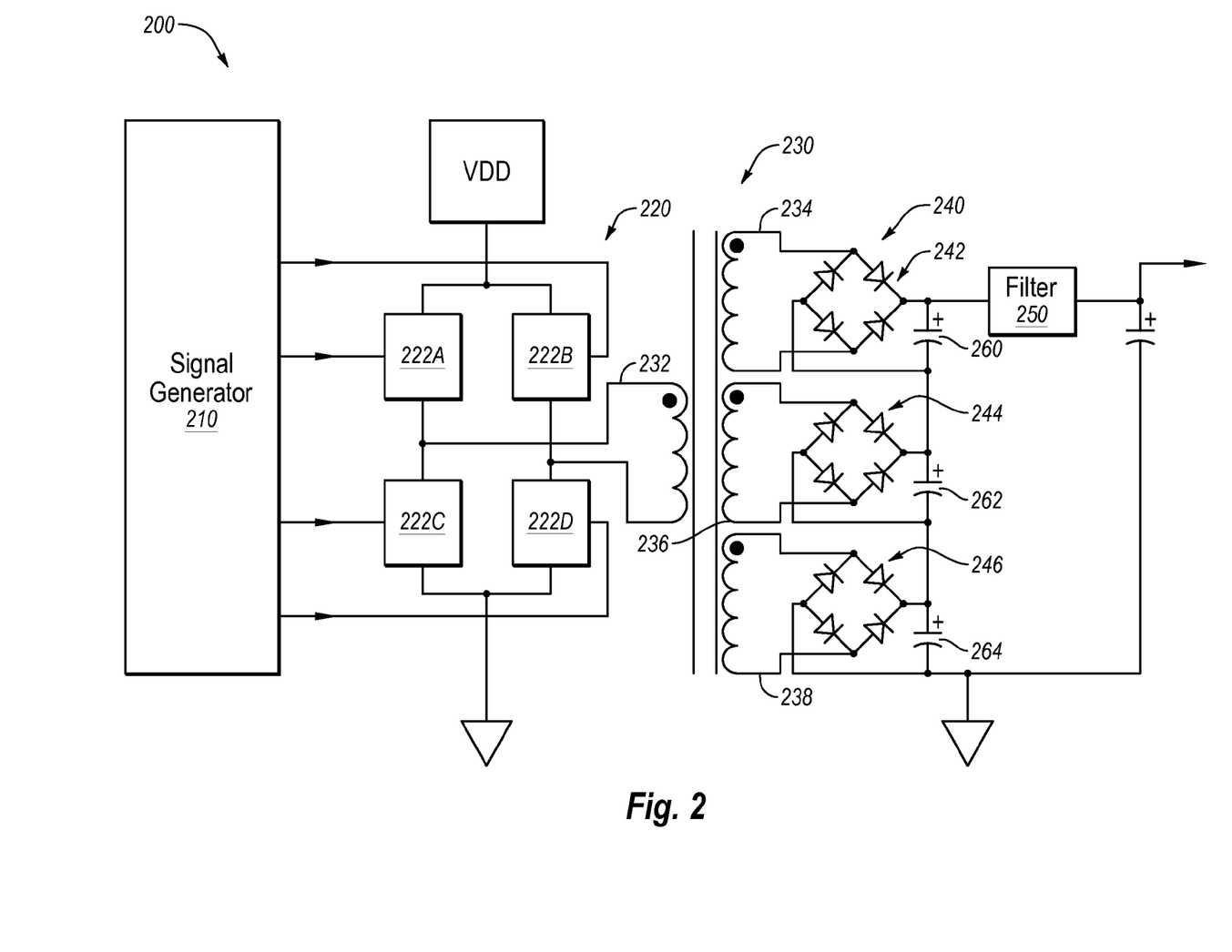
FIG. 2 is a circuit diagram of an example voltage converter.

FIG. 2 is a circuit diagram of an example voltage converter 200, arranged in accordance with at least some embodiments described herein. The voltage converter 200 may be analogous to the voltage converter 110 of FIG. 1 and may be configured to generate a generated voltage. The voltage converter 200 may include a signal generator 210, a switching unit 220, a transformer 230, a rectifying unit 240, a filter 250, and first, second, and third capacitors 260, 262, and 264.

Figure 5A:
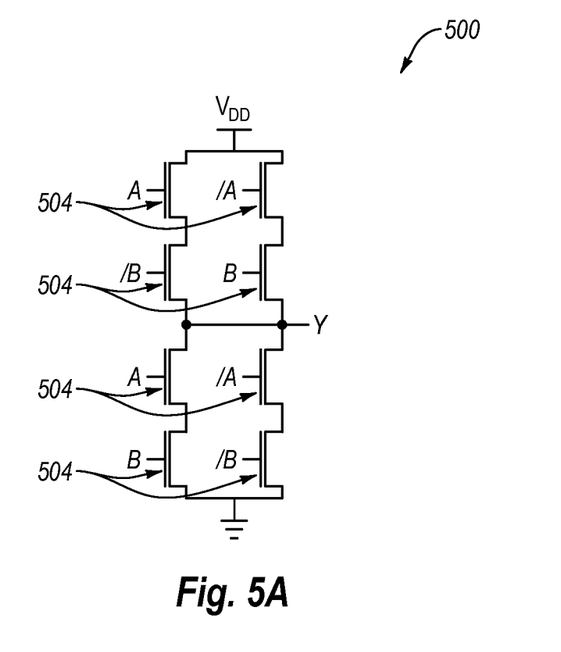
FIG. 5A is a circuit diagram of an example portion of a signal generator.
Figure 5B:
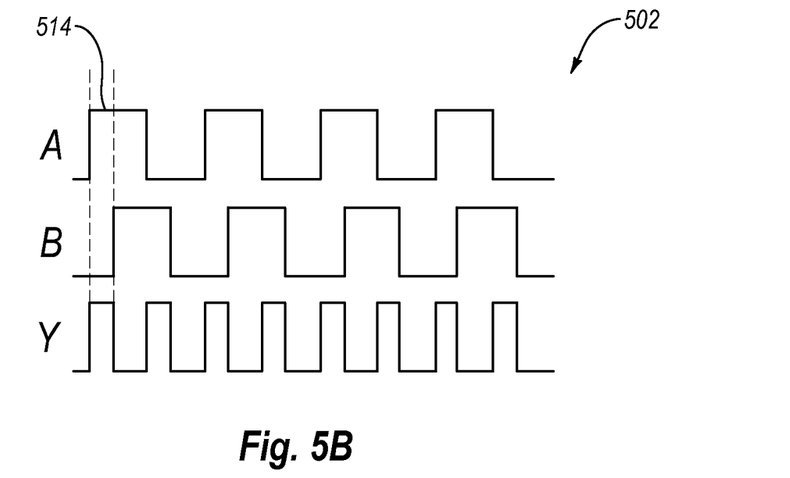
FIG. 5B illustrates an example signal set corresponding to the example portion of the signal generator of FIG. 5A.

The signal generator 210 is an example embodiment of the signal generator 112 of FIG. 1. The signal generator 210 may be configured to generate a PWM signal at a frequency that is greater than 30 MHz. The signal generator 210 may send the PWM signal to the switching unit 220. The duty cycle of the PWM signal may relate to a magnitude of the generated voltage produced by the voltage converter 200. An example of a portion of a signal generator is illustrated in FIG. 5A and a signal set corresponding to the signal generator is illustrated in FIG. 5B.

The switching unit 220 is an example embodiment of the switching unit 114 of FIG. 1. The switching unit 220 may include first, second, third, and fourth switches 222A, 222B, 222C, and 222D, referred to collectively as the switch or switches 222. Each of the switches 222 may be configured to receive the switching signal from the signal generator 210 at the same or approximately the same time.

In some embodiments, the switches 222 may be arranged in an H-bridge configuration, with the first and second switches 222A and 222B coupled between a voltage supply or voltage source (VDD) and the transformer 230 and the third and fourth switches 222C and 222D coupled between the transformer 230 and ground. In these and other embodiments, the switches 222 may be configured so that the first and second switches 222A and 222B switch between "on" and "off" states at the same or approximately the same time that the third and fourth switches 222C and 222D switch between the "off" and "on" states. As used herein, the term "on" may refer to a state in which the switch 222 is conducting current and the term "off" may refer to a state in which the switch 222 is not conducting current. Furthermore, the switches 222 may be configured so that when the switching signal is high, the switches 222 provide current to the transformer 230 and when the switching signal is low, the switches 222 draw current from the transformer 230. Thus, the longer the duty cycle of the switching signal, the more current that is supplied to the transformer 230 by the switching unit 220.

Figure 3A:
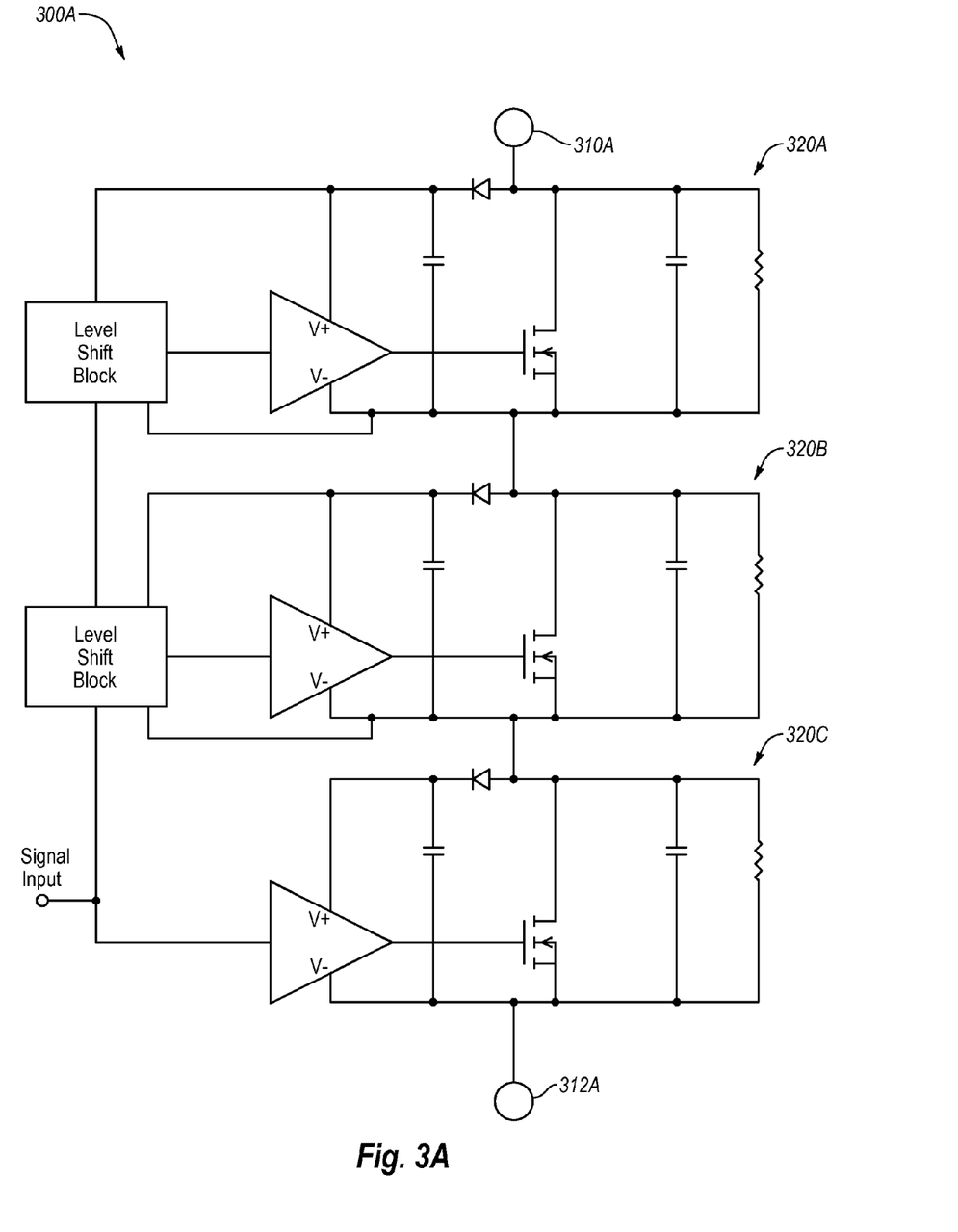
FIGS. 3A and 3B are circuit diagrams of example switches.
Figure 3B:
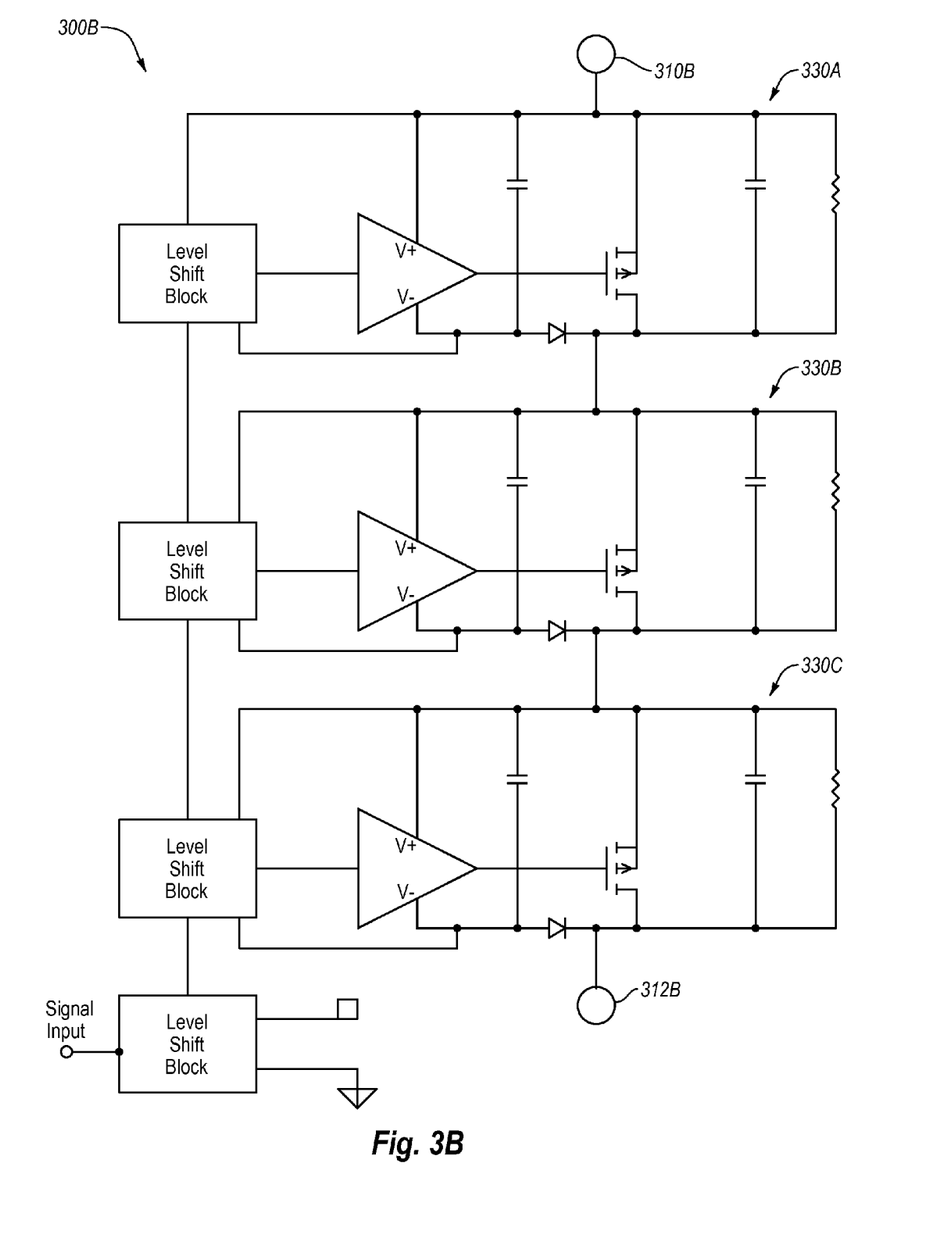

Each of the switches 222 may be formed by one or more transistors and various other passive and/or active components. Example configurations of the switches 222 are illustrated in FIGS. 3A and 3B. In particular, an example configuration for the first and second switches 222A and 222B is illustrated in FIG. 3B and an example configuration for the third and fourth switches 222C and 222D is illustrated in FIG. 3A.

Figure 6:
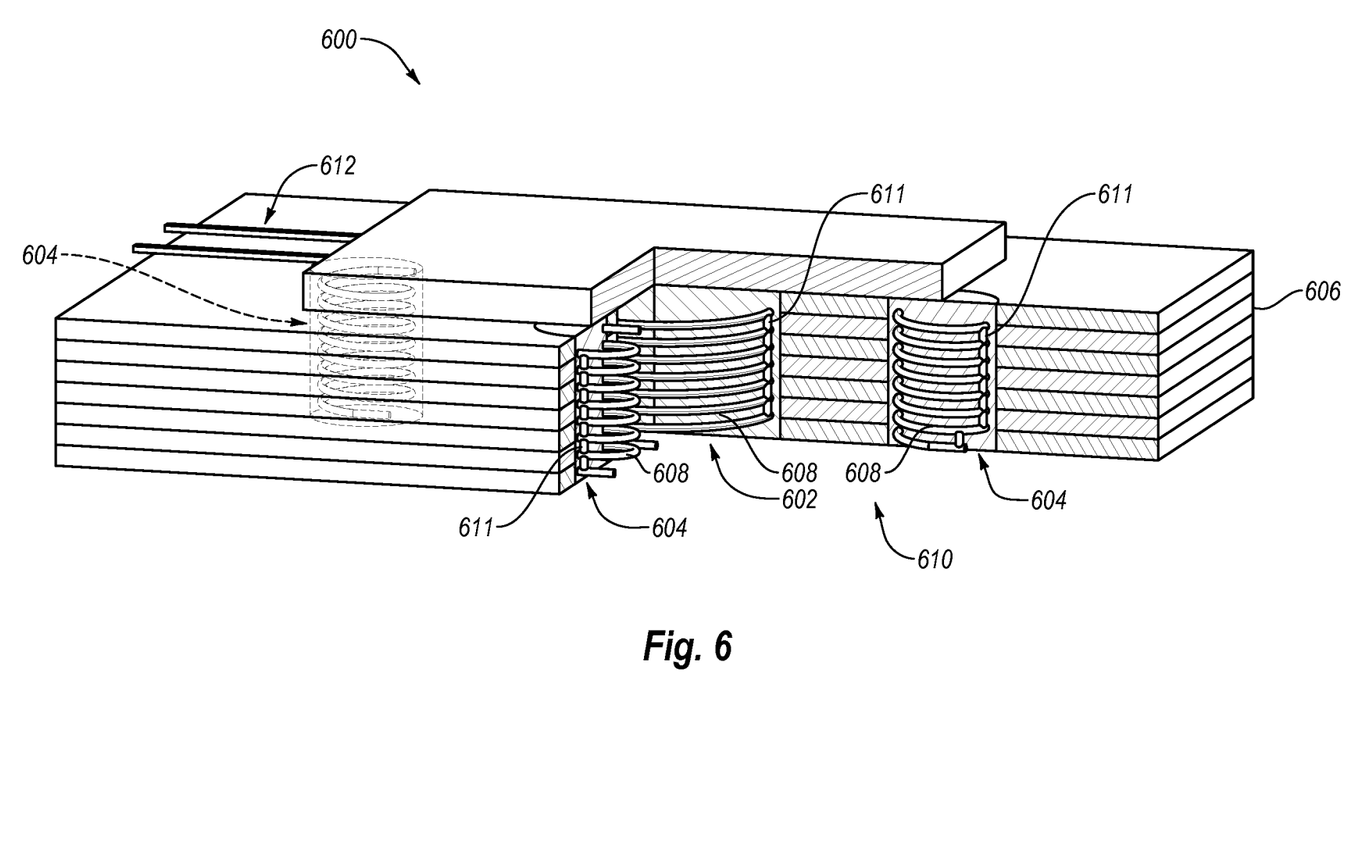
FIG. 6 illustrates an example inductor unit integrated into an integrated circuit.

The transformer 230 is an example embodiment of the inductive unit 116 of FIG. 1. The transformer 230 may include a primary inductor 232, and first, second, and third secondary inductors 234, 236, and 238. The primary inductor 232 may be coupled to the switching unit 220. In particular, a first lead of the primary inductor 232 may be coupled to one side of the first and third switches 222A and 222C and a second lead of the primary inductor 232 may be coupled to one side of the second and fourth switches 222B and 222D. The switching between supplying and not supplying current to the primary inductor 232 by the switching unit 220 results in a magnetic field being produced in the primary inductor 232 that induces a current in each of the secondary inductors 234, 236, 238. The voltage resulting from the current in each of the secondary inductors 234, 236, 238 is summed, resulting in the generated voltage. An example of a transformer integrated in an IC is illustrated in FIG. 6.

Figure 4:
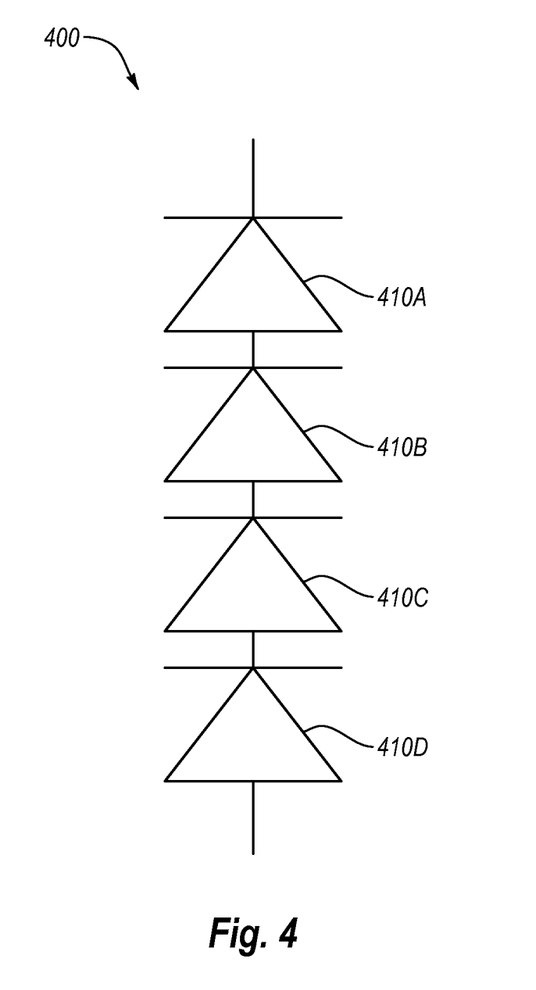
FIG. 4 is a circuit diagram of an example stacked diode circuit.

The transformer 230 is coupled to a rectifying unit 240 that includes first, second, and third rectifiers 242, 244, and 246. The first rectifier 242 is coupled to the first secondary inductor 234, the second rectifier 244 is coupled to the second secondary inductor 236, and the third rectifier 246 is coupled to the third secondary inductor 238. Each of the first, second, and third rectifiers 242, 244, and 246 may include four diodes configured in a diamond configuration. In some embodiments, the diodes may be Schottky diodes. Alternately or additionally, each of the Schottky diodes illustrated in FIG. 2 may be multiple stacked diodes. An example of multiple stacked diodes is illustrated in FIG. 4. Stacking the diodes may allow the diodes to be individually reduced in size while still having a breakdown voltage together that is sufficient for the generated voltages produced by the voltage converter 200.

The rectifying unit 240 may be configured to convert the currents, and thus the voltages, generated by the secondary inductors 234, 236, and 238 to direct currents and voltages. The capacitors 260, 262, and 264 may further smooth the voltages output by the rectifying unit 240 and may sum the voltages from each of the secondary inductors 234, 236, and 238 to produce the generated voltage.

The filter 250 is an example embodiment of the filter 118 of FIG. 2. The generated voltage may be filtered by the filter 250. In some embodiments, the filter 250 may remove ripples and other artifacts from the generated voltage. In some embodiments, the filter 250 may be an integrated Pi filter.

Modifications, additions, or omissions may be made to the voltage converter 200 without departing from the scope of the present disclosure. For example, the transformer 230 may include one, two, four, or more secondary inductors in place of the three secondary inductors illustrated. Alternately or additionally, the switching unit 220 may include more than the four switches 222 illustrated. For example, the switching unit 220 may include six or eight switches 222. Alternately or additionally, the switches 222 in the switching unit 220 may be configured in a different configuration than the H-Bridge configuration illustrated in FIG. 2. Alternately or additionally, the voltage converter 200 may not include the filter 250. Furthermore, the voltage converter 200 may include one or more passive and/or active components other than those illustrated.

FIG. 3A is a circuit diagram of an example switch 300A, arranged in accordance with at least some embodiments described herein. The switch 300A includes a signal input, a first node 310A, and a second node 312A. The switch 300A further includes first, second, and third transistor blocks 320A, 320B, and 320C, referred together as transistor blocks 320.

Each of the transistor blocks 320 includes a transistor and various passive and/or active components. The transistor blocks 320 are configured in a stacked formation as illustrated. Together the transistor blocks 320 act as a switch that couples or decouples the first and second nodes 310A and 312A based on a signal at the signal input while maintaining a voltage seen by transistors in each transistor block 320 below a voltage seen by the switch 300A and below a breakdown threshold level of the individual transistors in each transistor block 320. The transistors in the transistor blocks 320 may be EDMOS and/or OG EDMOS transistors that provide improved breakdown voltage characteristics while maintaining switching capabilities compatible with the switching signal frequencies used in a voltage converter, such as the voltage converter 110 of FIG. 1 or the voltage converter 200 of FIG. 2, and while maintaining a resistor-capacitor (RC) parasitic value that is low to reduce switching losses.

In some embodiments, the switch 300A may be used in place of the third switch 222C of FIG. 2 and in place of the fourth switch 222D of FIG. 2 so that the switch 300A is used twice in FIG. 2. In these and other embodiments, the first node 310A may be coupled to the primary inductor 232 and the second node 312A may be coupled to ground.

Modifications, additions, or omissions may be made to the switch 300A without departing from the scope of the present disclosure. For example, the switch 300A may include more or fewer transistor blocks 320.

FIG. 3B is a circuit diagram of an example switch 300B in a voltage converter, arranged in accordance with at least some embodiments described herein. The switch 300B includes a signal input, a first node 310B, and a second node 312B. The switch 300B further includes first, second, and third transistor blocks 330A, 330B, and 330C, referred together as transistor blocks 330.

Each of the transistor blocks 330 includes a transistor and various passive and/or active components. The transistor blocks 330 are configured in a stacked formation as illustrated. Together the transistor blocks 330 act as a switch that couples or decouples the first and second nodes 310B and 312B based on a signal at the signal input while maintaining a voltage seen by transistors in each transistor block 330 below a voltage seen by the switch 300B and below a breakdown threshold level of the individual transistors in each transistor block 330. The transistors in the transistor blocks 330 may be EDMOS and/or OG EDMOS transistors that provide improved breakdown voltage characteristics while maintaining switching capabilities compatible with the switching signal frequencies used in a voltage converter, such as the voltage converter 110 of FIG. 1 or the voltage converter 200 of FIG. 2, and while maintaining an RC parasitic value that is low to reduce switching losses.

In some embodiments, the switch 300B may be used in place of the first switch 222A of FIG. 2 and in place of the second switch 222B of FIG. 2 so that the switch 300B would be used twice in FIG. 2. In these and other embodiments, the first node 310B may be coupled to VDD and the second node 312B may be coupled to the primary inductor 232.

Modifications, additions, or omissions may be made to the switch 300B without departing from the scope of the present disclosure. For example, switch 300B may include more or fewer transistor blocks 330.

FIG. 4 is a circuit diagram of an example stacked diode circuit 400, arranged in accordance with at least some embodiments described herein. The stacked diode circuit 400 may include first, second, third, and fourth diodes 410A, 410B, 410C, and 410D coupled in series, referred to herein as the diodes 410. Stacking the diodes 410 as illustrated increases the operational voltage of the stacked diode circuit 400 as compared to an operational voltage of the individual diodes 410.

The diodes 410 may each be the same type of diode or different types of diodes. In some embodiments, the diodes 410 may by Schottky diodes. In some embodiments, the stacked diode circuit 400 may be an example of a diode in one of the rectifiers 242, 244, and 246 of FIG. 2.

Modifications, additions, or omissions may be made to the stacked diode circuit 400 without departing from the scope of the present disclosure. For example, the stacked diode circuit 400 may include more or fewer than the four diodes 410 illustrated.

FIG. 5A is a circuit diagram of a portion 500 of an example signal generator, arranged in accordance with at least some embodiments described herein. The portion 500 includes multiple transistors 504 arranged between a voltage source (VDD) and ground. The multiple transistors 504 are arranged so that an output Y of the portion 500 is a result of an XOR operation of inputs A and B to the portion 500. The portion 500 may be included in the signal generator 112 of FIG. 1 and/or the signal generator 210 of FIG. 2. Modifications, additions, or omissions may be made to the portion 500 without departing from the scope of the present disclosure.

FIG. 5B illustrates an example signal set 502 corresponding to the example portion 500 of the signal generator of FIG. 5A, arranged in accordance with at least some embodiments described herein. The signal set 502 includes an input A, an input B, and an output Y.

The output Y is "high" when either the input A or the input B is "high" and the output Y is "low" when the input A and the input B are both "high" and when the input A and the input B are both "low." The output Y may be the switching signal in FIG. 2 generated by the signal generator 112. The output Y has a frequency related to the frequencies of the inputs A and B. In the illustrated embodiment of FIG. 5B, the output Y has a frequency that is twice the frequency of the frequency of the input A and B. The output Y also has a duty cycle related to a phase difference 514 between inputs A and B. To adjust the duty cycle of the output Y, the phase difference between the inputs A and B may be adjusted. In some embodiments, the input B may be a delayed version of the input A. In these and other embodiments, the input A may be a signal within the integrated circuit that is copied and then delayed to generate the input B. In some embodiments, the amount of delay between the inputs A and B and thus the phase difference between the inputs A and B may be controlled to control the duty cycle of the output Y.

FIG. 6 illustrates an example inductor unit 610 integrated into an IC 600, arranged in accordance with at least some embodiments described herein. The inductor unit 610 may represent an example embodiment and/or may be included as part of the inductive unit 116 of FIG. 1 and/or the transformer 230 of FIG. 2. The inductor unit 610 may include a transformer that includes a primary coil 602 and multiple secondary coils 604. The inductor unit 610 is illustrated embedded in a multilayer low temperature co-fired ceramic (LTCC) laminate 606 that forms a portion of the IC 600.

In particular, the inductor unit 610 may include planar strips of conductive material that spiral through the multilayer LTCC laminate 606. The primary coil 602 and secondary coils 604 may each include a spiral wound coil extending through a thickness of the multilayer LTCC laminate 606. For example, the primary coil 602 and secondary coil 604 may include a plurality of rings 608 of a conductive material spaced apart from one another within the multilayer LTCC laminate 606. By way of example, a portion of or all of the rings 608 may be of a concentric size and shape and may be disposed in alignment with one another in the multilayer LTCC laminate 606. The rings 608 may be spiral connected to one another by interlayer transmission vias 611. The inductor unit 610 may further include transmission lines 612 on a surface of the multilayer LTCC laminate 606, or within the multilayer LTCC laminate 606, which may be coupled to other portions of a voltage converter in the IC 600.

Other components of the IC 600 may be fabricated on a surface of the multilayer LTCC laminate 606, beneath the multilayer LTCC laminate 606, and/or between the multilayer LTCC laminate 606 and a substrate (not illustrated). The inductor unit 610 may be utilized, for example, as the transformer 230 of the voltage converter 200 of FIG. 2.

Modifications, additions, or omissions may be made to the inductor unit 610 without departing from the scope of the present disclosure. For example, the inductor unit 610 may include more or fewer coils than those illustrated. Alternately or additionally, the coils may include fewer or more rings 608 than illustrated.

Figure 7:
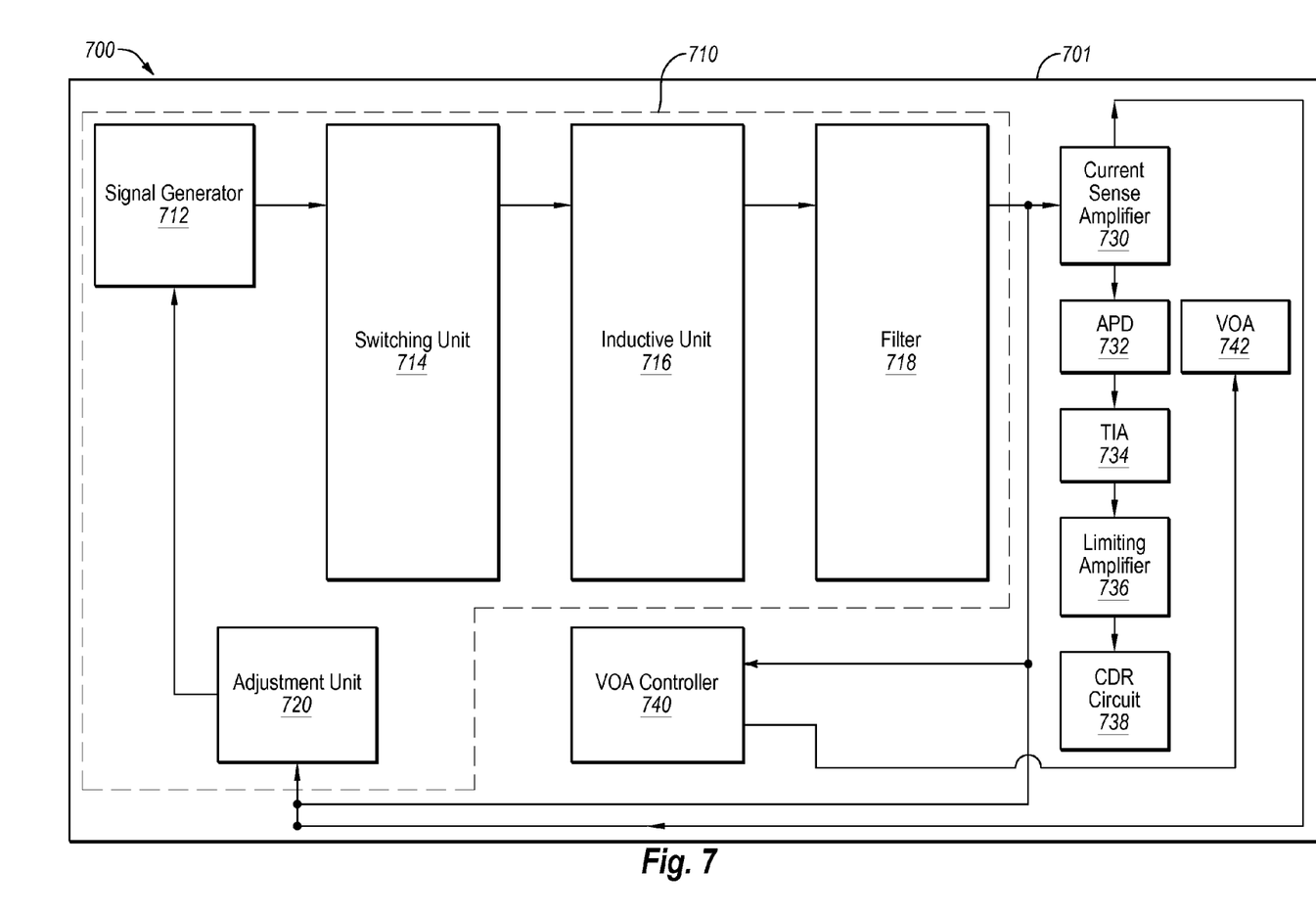
FIG. 7 is a block diagram of another example integrated circuit that includes a voltage converter.

FIG. 7 is a block diagram of another example IC 700 that includes a voltage converter 710, arranged in accordance with at least some embodiments described herein. The IC 700 may be formed on a substrate 701. The substrate 701 may be analogous to the substrate 101 of FIG. 1; as such, the substrate 701 may include an SOI substrate in some embodiments. The IC 700 may further include a voltage converter 710 that includes a signal generator 712, a switching unit 714, an inductive unit 716, a filter 718, and an adjustment unit 720. The signal generator 712, the switching unit 714, the inductive unit 716, the filter 718, and the adjustment unit 720 may be analogous to the signal generator 112, the switching unit 114, the inductive unit 116, the filter 118, and the adjustment unit 120, respectively, of FIG. 1. The voltage converter 710 may include components integrated into the IC 700 that are configured to provide a generated voltage larger in magnitude than a magnitude of a supplied voltage of the IC 700.

The IC 700 may be implemented in an optical transceiver of a network in which constant optical power, constant wavelength, or both, are desired for operation. For example, the optical transceiver may be implemented in a network that uses dense wavelength division multiplexing (DWDM) to couple light signals from multiple transmitters into a single optical fiber. As a result, the IC 700 may include a current sense amplifier 730, an APD 732, a TIA 734, a limiting amplifier 736, a CDR circuit 738, a VOA controller 740, and a VOA 742.

The VOA 742 may be configured to adjust optical power or shut off optical input to the APD 732. In these and other embodiments, the VOA 742 may be a high voltage, low current VOA integrated in the optical path before the APD 732. As used herein, the term "high voltage" may refer to a voltage of greater than about 10 V and, more particularly, to a voltage of between about 25 volts and 45 volts and the term "low current" may refer to a current of about 10 nanoampere (nA). Such a high voltage, low current VOA may facilitate fabrication of a high-speed optoelectronic device.

For example, the optical transceiver may be implemented in a network that uses DWDM to couple light signals from multiple transmitters into a single optical fiber. In this case, suppressing wavelength transients during initial power up and/or channel selection of the transmitter and maintaining a particular optical output power (without changing the bias of the transmitter to avoid affecting the transmitter's performance) may be useful to the proper operation of the DWDM network.

In some embodiments, the VOA 742 may be a microelectrical-mechanical system (MEMS). The VOA 742 may be included in SiGe BICMOS process in the form of waveguide-fed radio frequency microelectromechanical system (RF MEMS) shutter device. The VOA 742 may be controlled by the VOA controller 740.

The APD 732 is a semiconductor electronic device that utilizes the photoelectric effect to convert light to electricity. The APD 732 may include an absorption region and a multiplication region. For example, the absorption region of the APD 732 may include germanium for 1310/1550 NM applications and the multiplication region of the APD 732 may include silicon for low multiplication noise. The structure of the APD 732 may be compatible with processing techniques now known or later developed for forming BiCMOS structures, such as Silicon Germanium BiCMOS (SiGe BiCMOS) on SOI and ED-OG SiGe BICMOS on SOI.

The APD 732 may be fabricated on the substrate 701 implemented as an SOI substrate. For example, the APD 732 may be formed in the silicon layer overlying the buried oxide of the substrate 701 implemented as an SOI substrate. The APD 732 may include an anode, a cathode and a depletion region. Electrodes may be formed on the silicon layer in electrical communication with the anode and cathode of the APD 732. For example, the electrodes may be formed on a surface of each APD 732 opposite the buried oxide. The buried oxide of the substrate 701 implemented as an SOI substrate may electrically help to isolate the APD 732 from other circuits and reduce noise pickup.

The internal gain of the APD 732 may be set by a digitally controlled variable bias voltage, which may be between about 25 volts and about 45 volts in some embodiments. The higher the bias voltage, the higher the gain of the APD 732 up to a voltage where the APD enters breakdown. The bias voltage may be the generated voltage provided by the voltage converter 710.

The current sense amplifier, the TIA 734, the limiting amplifier 736, and the CDR circuit 738 may operate to provide the functionality for the IC 700 to be an optical transceiver.

Modifications, additions, or omissions may be made to the IC 700 without departing from the scope of the present disclosure. For example, the IC 700 may not include the limiting amplifier 736 or the CDR circuit 738. Alternately or additionally, the IC 700 may include additional integrated components.

Figure 8:
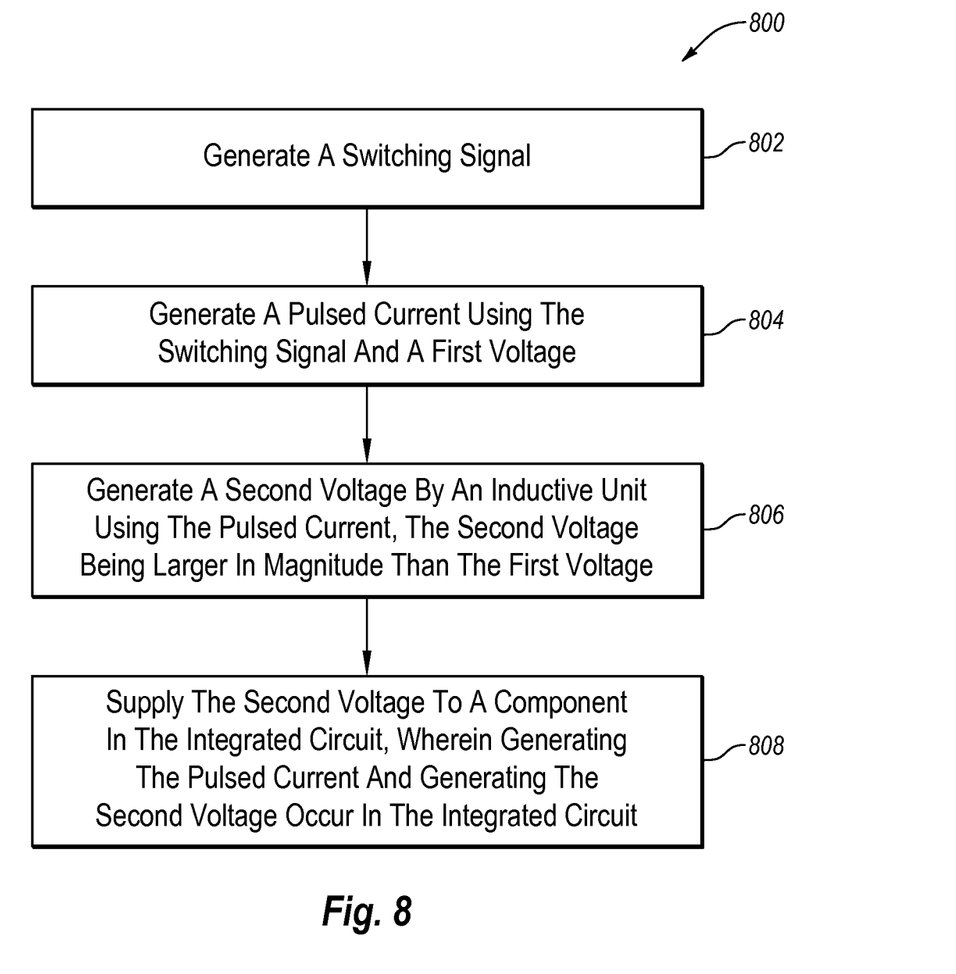
FIG. 8 is a flow chart of an example method of generating a voltage in an integrated circuit.

FIG. 8 s a flow chart of an example method 800 of generating a voltage in an integrated circuit, arranged in accordance with at least some embodiments described herein. The method 800 may be implemented, in some embodiments, by a voltage converter, such as the voltage converter 110, 200, and/or 710, of FIG. 1, 2, or 7, respectively. Although illustrated as discrete blocks, various blocks may be divided into additional blocks, combined into fewer blocks, or eliminated, depending on the desired implementation.

The method 800 may begin at block 802 where a switching signal may be generated. In some embodiments, the switching signal may have a frequency greater than fifty MHz. In some embodiments, the switching signal may be a pulse width modulated signal.

In block 804, a pulsed current may be generated using the switching signal and a first voltage. In block 806, a second voltage may be generated by an inductive unit using the pulsed current. The second voltage may be larger in magnitude than the first voltage. In some embodiments, the second voltage may have a different polarity than the first voltage.

In block 808, the second voltage may be supplied to a component in the integrated circuit. Generating the pulsed current and generating the second voltage may occur in the integrated circuit. In some embodiments, the switching signal may be generated in the integrated circuit.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. An integrated circuit comprising:
    an input node configured to be coupled to a first voltage;
    a signal generator configured to generate a switching signal;
    a switching unit coupled to the signal generator, the switching unit comprising a plurality of switches that each comprise a plurality of orthogonal gate extended drain CMOS transistors, the plurality of switches configured to generate a pulsed current based on the switching signal using the first voltage;
    an inductive unit coupled to the switching unit, the inductive unit configured to receive the pulsed current and generate a second voltage different from the first voltage, wherein the second voltage is greater in magnitude than the first voltage and the plurality of orthogonal gate extended drain CMOS transistors are arranged to divide the second voltage across each individual orthogonal gate extended drain CMOS transistor such that each individual orthogonal gate extended drain CMOS transistor only experiences a portion of the second voltage that does not exceed a breakdown voltage associated with each individual orthogonal gate extended drain CMOS transistor;
    an avalanche photodiode configured to receive the second voltage; and
    a substrate upon which the avalanche photodiode, the inductive unit, the switching unit, and the signal generator are formed.

2. The integrated circuit of claim 1, wherein the switching signal has a frequency greater than fifty megahertz.

3. The integrated circuit of claim 1, wherein the plurality of transistors in each switch are arranged in a stacked formation.

4. An integrated circuit comprising:
    a signal generator configured to generate a switching signal;
    a switching unit coupled to the signal generator, the switching unit configured to generate a pulsed current based on the switching signal using a first voltage, the switching unit configured to operate at frequencies greater than thirty megahertz;
    an inductive unit coupled to the switching unit, the inductive unit configured to receive the pulsed current and to generate a second voltage different from the first voltage, wherein the second voltage is greater in magnitude than the first voltage and the switching unit is configured to divide the second voltage across the switching unit such that the second voltage divided across the switching unit does not exceed a breakdown voltage associated with the switching unit;
    an avalanche photodiode configured to receive the second voltage; and
    a substrate, wherein the signal generator, the switching unit, the inductive unit, and the avalanche photodiode are formed on the substrate.

5. The integrated circuit of claim 4, wherein the switching signal has a frequency greater than fifty megahertz.

6. The integrated circuit of claim 4, wherein the switching unit comprises a plurality of switches that switch on and off based on a level of the switching signal to generate the pulsed current.

7. The integrated circuit of claim 6, wherein each switch comprises a plurality of transistors.

8. The integrated circuit of claim 7, wherein the plurality of transistors in each switch are arranged in a stacked formation.

9. The integrated circuit of claim 4, wherein the second voltage has a different polarity than the first voltage.

10. The integrated circuit of claim 4, wherein the inductive unit is a transformer, an inductor, or an auto-transformer.

11. The integrated circuit of claim 4, wherein the signal generator is a pulse width modulated circuit and the switching signal is a pulse width modulated signal.

12. The integrated circuit of claim 11, wherein a magnitude of the second voltage is proportional to a duty cycle of the pulse width modulated signal.

13. The integrated circuit of claim 4, further comprising a filter coupled to the inductive unit and configured to filter the second voltage.

14. The integrated circuit of claim 4, further comprising an input node configured to be coupled to the first voltage.

15. A method of generating a voltage in an integrated circuit, the method comprising:
    generating a switching signal having a frequency of at least thirty megahertz;
    generating a pulsed current by a switching unit using the switching signal and a first voltage;
    generating a second voltage by an inductive unit using the pulsed current, the second voltage being larger in magnitude than the first voltage;
    dividing the second voltage across the switching unit such that the second voltage divided across the switching unit does not exceed a breakdown voltage associated with the switching unit; and
    supplying the second voltage to an avalanche photodiode in the integrated circuit, wherein generating the pulsed current and generating the second voltage occur in the integrated circuit.

16. The method of claim 15, wherein the switching signal has a frequency greater than fifty megahertz.

17. The method of claim 15, wherein the second voltage has a different polarity than the first voltage.

18. The method of claim 15, wherein the switching signal is a pulse width modulated signal.

19. The method of claim 15, wherein generating the switching signal occurs in the integrated circuit.

* * * * *